(12) United States Patent
Fery et al.

(10) Patent No.: US 7,580,529 B2
(45) Date of Patent: Aug. 25, 2009

(54) METHOD FOR VERIFYING DIGITAL FRANKING NOTES

(75) Inventors: Peter Fery, Zwingenberg (DE); Juergen Helmus, Bonn (DE); Gunther Meier, Reinheim (DE); Dieter Stumm, Grossefehn (DE); Carsten Vullriede, Hodenhagen (DE)

(73) Assignee: Deutsche Post AG, Bonn (DE)

( * ) Notice: Subject to any disclaimer, the term of this patent is extended or adjusted under 35 U.S.C. 154(b) by 550 days.

(21) Appl. No.: 10/543,962

(22) PCT Filed: Jan. 21, 2004

(86) PCT No.: PCT/DE2004/000083

§ 371 (c)(1),
(2), (4) Date: Mar. 20, 2006

(87) PCT Pub. No.: WO2004/072911

PCT Pub. Date: Aug. 26, 2004

(65) Prior Publication Data

US 2006/0190732 A1    Aug. 24, 2006

(30) Foreign Application Priority Data

Feb. 12, 2003 (DE) .................... 103 05 730

(51) Int. Cl.
*H04L 9/00* (2006.01)
*G07B 17/04* (2006.01)

(52) U.S. Cl. ....................... 380/277; 705/405

(58) Field of Classification Search ............... 713/163, 713/176, 64; 705/51, 60–62, 405; 380/2, 380/277–279

See application file for complete search history.

(56) References Cited

U.S. PATENT DOCUMENTS

| 5,150,408 A | 9/1992 | Bright | 380/21 |
| 5,150,508 A | 9/1992 | St. Denis | 29/463 |

(Continued)

FOREIGN PATENT DOCUMENTS

EP    735 722 A2    10/1996

(Continued)

OTHER PUBLICATIONS

Menezes, Alfred J., van Oorschot, Paul C., Vanstone, Scott A. Handbook of Applied Cryptography. Boca Raton, Florida: CRC Press, 1997. pp. 551-581.*

(Continued)

*Primary Examiner*—Gilberto Barron, Jr.
*Assistant Examiner*—Christopher B Archer
(74) *Attorney, Agent, or Firm*—Marshall, Gerstein & Borun LLP

(57) ABSTRACT

Digital franking notes generated in customer systems and comprise cryptographic information that is used for verifying the postage indicia in local payment assurance systems. A data key used for generating the postage indicia is generated in a value transfer center and transmitted via a central payment assurance system to the local payment assurance systems, which import the key in order to verify franking notes generated using the key. The local payment assurance systems notify the value transfer center of successful key imports. After a successful import, the value transfer center issues a data key to the customer systems and postage indicia are verified by decrypting the contained cryptographic information in the local payment assurance systems.

12 Claims, 9 Drawing Sheets

U.S. PATENT DOCUMENTS

| | | | |
|---|---|---|---|
| 5,481,613 A | 1/1996 | Ford et al. | 380/30 |
| 5,748,736 A * | 5/1998 | Mittra | 713/163 |
| 6,820,065 B1 * | 11/2004 | Naclerio | 705/401 |
| 7,089,211 B1 * | 8/2006 | Trostle et al. | 705/51 |
| 7,231,517 B1 * | 6/2007 | Mashayekhi | 713/167 |
| 2004/0039714 A1 | 2/2004 | Meyer et al. | 705/408 |
| 2004/0249764 A1 | 12/2004 | Delitz et al. | 705/60 |

FOREIGN PATENT DOCUMENTS

| | | |
|---|---|---|
| EP | 735 722 A3 | 10/1996 |
| EP | 854 444 A2 | 7/1998 |
| EP | 854 444 A3 | 7/1998 |
| WO | WO 01/17160 AL | 3/2001 |

OTHER PUBLICATIONS

"Secret Key Distribution" from http://csrc.nist.gov/publications/nistpubs/800-7/node209.html dated Oct. 7, 1994.

International Search Report in PCT/DE2004/000083 dated Jun. 22, 2004.

International Preliminary Examination Report in PCT/DE2004/000083 dated Jan. 31, 2005.

* cited by examiner

| |
|---|
| +CAR_ERROR_CREATESTRING_NOST |
| +DEFAULT_KEY_TEXT:String=new |
| +DEFAULT_ERROR_TEXT:String=n |
| -DEFAULT_USERNAME:byte[]=(ne |
| -DEFAULT_USERPWD:byte[]=(new |
| -isErrorDll(id:int):boolean |
| -loginDll(hSession:long,user |
| -logoutDll(hSession:long):bo |
| -closeSessionDll(ID:int):boo |
| -getLogCountDll():int |
| -getSessionIDDll(hSession:lo |
| -getKeyListCounterDll():int |
| -getErrorNrDll(id:int):long |
| -getASessionDll():long |
| -checkHashDll(id:int,toHash: |
| -enCryptDll(id:int,cryptoPk: |
| -deCryptDll(id:int,cryptoPk: |
| -getErrorTextDll(errorNr:lon |
| -getKeyClassDll(hSession:lon |
| -getKeyLabelDll(hSession:lon |
| -getKeyTypeDll(hSession:long |
| -getKeyStartDateDll(hSession |
| -getKeyEndDateDll(hSession:l |
| -getKeyIDDll(pos:int):String |
| +CryptoAdapter() |
| +loadDll():boolean |
| +getLogCountNr():int |
| +isDllLoaded():boolean |
| +login():boolean |
| +setUserName(newUserName:Str |
| +setUserPwd(newUserPwd:Strin |

Fig. 7B

+logout():boolean
+getASession():CryptoAdapter
+isMainError():boolean
+getMainErrorNr():long
+getMainErrorText():String
+getKeyListCounter():int
+getKeyID(pos:int):String
+getKeyClass(pos:int):String
+getKeyLabel(pos:int):String
+getKeyType(pos:int):String
+getKeyStartDate(pos:int):St
+getKeyEndDate(pos:int):Stri
enCrypt(id:int,cryptoPk:byt
deCrypt(id:int,cryptoPk:byt
checkHash(id:int,toHash:byt
isError(id:int):boolean
getErrorNr(id:int):long
getErrorText(errorNr:long):
closeSession(ID:int):boolean

--- logCountNr:int
dllLoaded:boolean
userName:String
userPwd:String
ASession:CryptoAdapterWorker
mainError:boolean
mainErrorNr:long
mainErrorText:String
keyListCounter:int
keyID:String[]
keyClass:String[]
keyLabel:String[]
keyType:String[]
keyStartDate:String[]
keyEndDate:String[]

Fig. 7C

METHOD FOR VERIFYING DIGITAL FRANKING NOTES

BACKGROUND OF THE INVENTION

1. Field of the Invention

The invention relates to a method for verifying the authenticity of a postage indicium generated using a franking key and applied onto a mailpiece, whereby cryptographic information contained in the postage indicium is decrypted and used for verifying the authenticity of the postage indicium.

2. Related Technology

It is a known procedure to provide mailpieces with digital postage indicia.

In order to make it easier for the senders of the mailpieces to produce postage indicia, it is possible, for example, with the franking system used by the Deutsche Post AG, to produce postage indicia in a customer system and to output them on a printer via any desired interface.

A method of this generic type is disclosed in DE 100 20 402 A1.

In order to avoid fraudulent use of this method, the digital postage indicia contain cryptographic information, for example, about the identity of the customer system controlling the production of the postage indicium.

International Patent Publication WO 01/17160 A1 relates to a method for the distribution of keys in which keys are generated by a central management unit and are transmitted in encrypted form by a distribution unit to encryption devices. These devices send a message about the successful or failed receipt of a key via the distribution unit to the management unit. If it was not possible to receive the key successfully, it is once again transmitted in unencrypted form to the appertaining encryption device.

EP 0 854 444 A2 discloses a method for encrypting and checking postage indicia that are produced with a franking machine. Here, additional keys are derived from a master key implemented in the franking machine and they are used for producing postage indicia. In a mail center, the additional keys are likewise generated and used for checking the postage indicia.

U.S. Pat. No. 5,150,408 discloses a method for key distribution in a communication system such as, for example, a wireless network, in which an encrypted message is transmitted to a communication device by a key distribution unit. After this message has been received, the communication device sends a confirmation to the key distribution unit.

The known standard ANSI X9.17 for the transmission of encrypted data (see URL http://csrc.nist.gov/publications/nistpubs/800-7/node209.html dated Oct. 7, 1994) is based on a key hierarchy of several keys. Here, at least one data key exists for encrypting data having a short lifetime, which is exchanged electronically and in encrypted form between communication partners as well as a key for encrypting the data key, which is exchanged manually. Moreover, the cited document describes the known Diffie-Hellmann method for encrypting data in which the communication partners compute a shared key from known numbers and from a secret random number.

EP 0 735 722 A2 describes a key management system for generating, distributing and managing keys for franking machines. Here, there are several secure areas that are connected to computers that allow communication among the areas as well as control of the areas. The generation of keys, their installation and their verification and confirmation are each carried out in one of the secure areas. Each area is associated with an archive in which the status of the area is protocolled.

GENERAL DESCRIPTION

A method of verifying the authenticity of postage indicia quickly and reliably is disclosed. In particular, the method is suitable for use in verification procedures on a large scale, especially in mail centers or freight centers.

The method for verifying the authenticity is carried out in such a way that a data key is generated and transmitted from a central database (ZinS central system) to local payment assurance systems (ZinS local). This is done by using a generated franking key and a postage indicium applied onto a mailpiece, whereby cryptographic information contained in the postage indicium is decrypted and used to verify the authenticity of the postage indicium.

In order to increase the security, local payment assurance systems advantageously import the data key and transmit a result of the import to the central database (ZinS central system).

The result of the import may be transmitted as a data record.

The data record may contain a key. The key can have various attributes. In particular, the key can be either a symmetrical key or an asymmetrical key. Depending on the intended use, the key serves to decrypt and/or encrypt information. By virtue of its nature, the key can likewise transport information. For example, the key may contain information about the franking key, a key generation or a key end date.

In order to ensure a uniform key exchange, the central database (ZinS central system) checks the result of the import and transmits the result to a value transfer center (Postage Point).

The method may carry out further process steps in the value transfer center as a function of the result of the import.

The result can be checked in various ways. For example the result may be checked by decryption of the key.

In another embodiment of the method, once the data key has been successfully imported into essentially all local payment assurance systems (ZinS local), the data key may be released as a new franking key at the value transfer center (Postage Point) and may subsequently be used for producing new postage indicia.

The method may carry out a key exchange in the value transfer center as a function of previously performed key exchanges in the payment assurance systems. This measure ensures that postage indicia will only be produced using the new key once the new key is already present in the local payment assurance systems. Thus, the local payment assurance systems can verify the validity of each of the postage indicia produced.

The method performs the key exchange quickly and reliably and the execution of each key exchange is verified.

When the key exchange is performed, the new data key may be transmitted from the value transfer center (Postage Point) to the central payment assurance system.

The value transfer center advantageously encrypts the data key with a transport key (KT).

The transport key may be encrypted with a master transport key (KTM).

The data key may be generated in the area of the value transfer center, advantageously preventing fraudulent changes to the data key during transport to the value transfer center.

In order to further increase the data security, the data key may be provided with key identification information.

Advantageously, the key identification information may be likewise transmitted in encrypted form.

In order to ensure that a valid data key is used for each of the encryption and/or decryption steps employed, it is advantageous for the data key to be provided with a generation counter and/or to be transmitted together with the generation counter.

In order to avoid the use of invalid keys, it is also advantageous for the franking key to be provided with an end date for the preceding data key and/or to be transmitted together with the end date.

The described data key can be used for one or more partial verifications as well as for producing postage indicia and/or for decrypting information contained in the postage indicia.

One of the partial verifications may comprise the decryption of cryptographic information contained in the postage indicium.

By integrating the decryption of the cryptographic information into the verification process, the authenticity of the postage indicia may be ascertained directly so that the verification can be carried out in real time.

Moreover, it is advantageous for one of the partial verifications to comprise a comparison between the production date of the postage indicium and the current date. The integration of the production date of the postage indicium—especially in encrypted form—increases the data security, since multiple use of a postage indicium is prevented through the comparison between the production date of the postage indicium and the current date.

In order to further increase the verification speed, it is advantageous for the reading unit and the verification unit to exchange information by means of a synchronous protocol.

In another embodiment of the invention, the reading unit and the verification unit may communicate with each other via an asynchronous protocol.

In this embodiment the reading unit may send a data telegram to the verification unit.

The data telegram may contain the content of the postage indicium.

BRIEF DESCRIPTION OF THE DRAWINGS

Additional advantages, special features and practical refinements of the invention can be understood from the description below of preferred embodiments making reference to the drawings.

DETAILED DESCRIPTION

Below, the invention will be described with reference to a PC franking system. Here, the process steps that serve for payment assurance are independent of the system used for producing the postage indicia.

The described decentralized verification at individual verification stations, especially in mail centers, is especially preferred, but by the same token, centralized verification is also possible.

In one embodiment of the invention, the individual verification stations are local payment assurance systems that are connected to a central payment assurance system via a data connection.

The central payment assurance system may be connected to a value transfer center.

Embodiments of the value transfer center are referred to below as a Postage Point. Embodiments of the central payment assurance system are referred to below as ZinS central.

The technical interface to be implemented between the value transfer center and the payment assurance system comprises an exchange of cryptographic keys.

The key exchanged between the value transfer center and the payment assurance system ensures that the produced postage indicia are substantially forgery-proof. Part of the content of the 2D barcode that forms the postage indicium is encrypted using the key. Since, for performance-related reasons, the selected key is a symmetrical key, the key is transmitted from the value transfer center to the payment assurance system, where the key is distributed to the individual mail centers.

Reliable storage of the keys is provided by using crypto-cards. The keys may be managed using the crypto-cards. The entire life cycle of the keys, from generation, export and distribution to import into the decentralized systems is used in order to optimize the process parameters.

Figure 1:
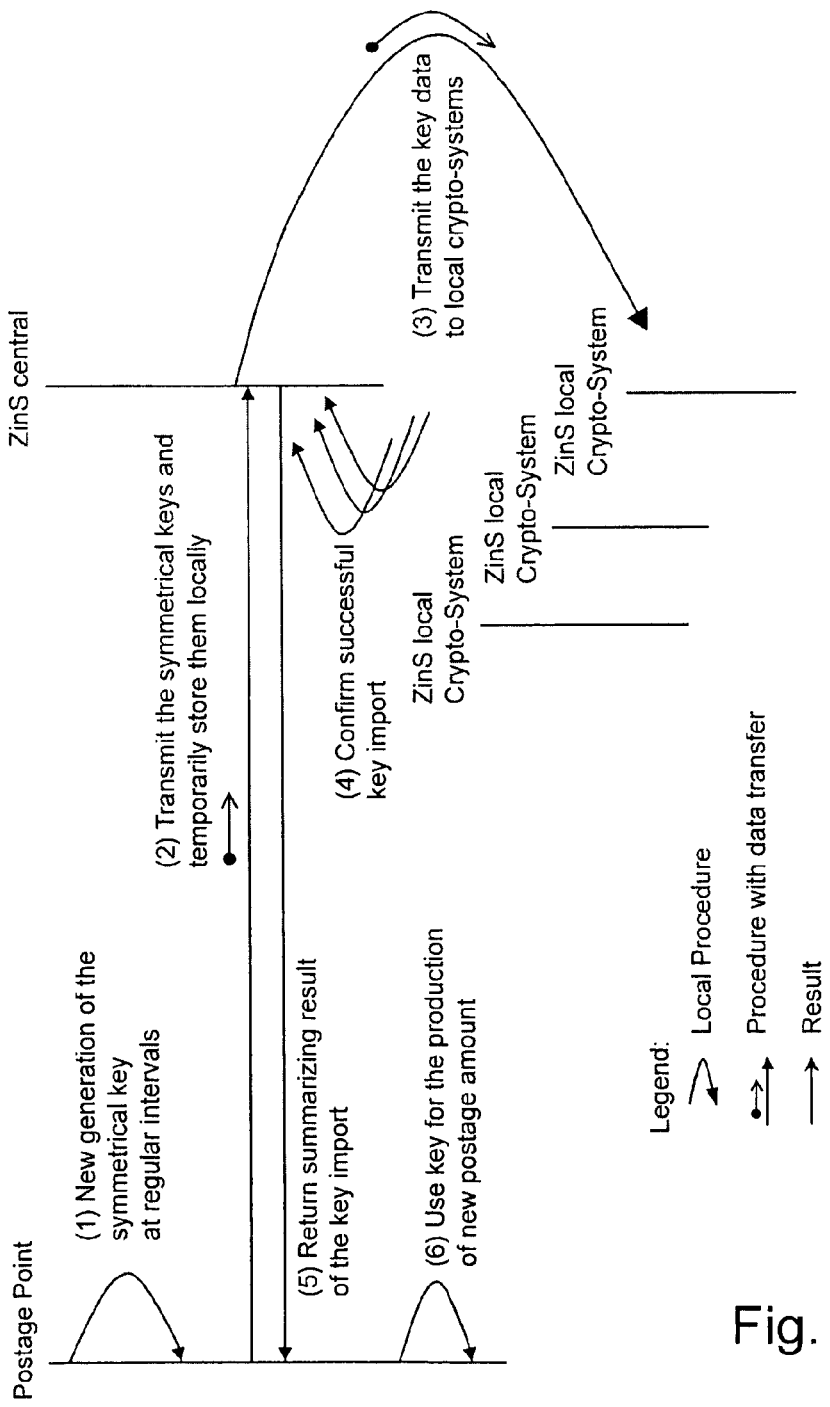
FIG. 1 is a schematic diagram of a key distribution according to the disclosure.

FIG. 1 shows a key distribution between the value transfer center and the central payment assurance system.

In a first process step 1 for an exchange of a franking key used in the production of postage indicia, a new franking key is generated.

The term franking key here is by no means to be understood in a restrictive sense since the described keys can be used in different ways for producing postage indicia.

For example, it is possible to use the franking key directly for producing postage indicia.

However, it is likewise possible for systems with an especially high security against manipulation to produce postage indicia with a multi-encrypted data content, whereby the data content is preferably formed as a result of several operations, whereby at one or more places, the result of an operation is incorporated into the postage indicium with the franking key.

For example, a crypto-string of the type disclosed in DE 100 20 402 A1, may be incorporated into the franking key.

In order to further improve the protection against a fraudulent production of postage indicia, an event-specific exchange of the franking key takes place.

In the presented case, the franking key is newly generated at regular intervals, for example, after the expiration of a predefinable time interval.

However, it is likewise possible to carry out a new generation of the franking key as a function of other parameters, for example, on the basis of the loaded postage amounts and/or of the franked mailpieces.

As a matter of principle, a new generation of the new franking key can be carried out anywhere. However, in order to increase the data security, it is advantageous to minimize the transmission effort for the new franking key and to generate the key in the value transfer center, or in the area of the value transfer center.

In order to ensure a high level of protection of the method against fraud, it is advantageous for information contained in the postage indicia to be decrypted on the basis of a franking key in the area of local payment assurance systems, for example, in mail centers or freight centers.

In order to ensure this, the franking keys are transmitted from the value transfer center to the central payment assurance system. Preferably, the transmission is automated.

The exchange is preferably effectuated via a server of the payment assurance system (ZinS central server). The value transfer center (Postage Point) does not have to be configured. Since the server does not have to know the value transfer center (ZinS local systems) and its appertaining crypto-systems, exclusively the ZinS central server is of importance for said server.

After the new generation of a preferably symmetrical franking key, the latter is securely transmitted to the central payment assurance system—process step 2 in FIG. 1—and distributed from there to the crypto-systems located in the local payment assurance systems—process step 3 in FIG. 1. The local payment assurance systems return the result of the import operation—process step 4 in FIG. 1—and thus confirm the successful key import. The result is compiled by the central system, validated and transmitted to the value transfer center (Postage Point)—process step 5 in FIG. 1.

Once the key has been successfully imported into all of the crypto-systems of the local payment assurance systems, it is released at the value transfer center (Postage Point) and subsequently used for the generation of new postage amounts—process step 6 in FIG. 1.

The preferably symmetrical keys are an integral part of the forgery security of postage indicia produced using the franking key, whereby said postage indicia are, for example, in the form of two-dimensional barcodes. Thus, the exchange of these keys may be secured by strong cryptography according to the following points:

Confidentiality of the content: it must not be possible for third parties to read out the transmitted keys during the transmission. Moreover, it must also be ensured that the keys are securely stored and cannot be read out by third parties. The latter functionality is ensured by the Web-Sentry crypto-card.

Integrity of the content: it must not be possible for third parties to forge parts of the key.

Authentication: both communication partners must be certain that the identity of the sender/recipient is correct. From the viewpoint of the recipient, this means that the key was generated by the Postage Point. From the viewpoint of the sender, it must be ensured that only valid ZinS local crypto-systems are allowed to receive the key.

In the symmetrical method presented, both communication partners have the same key KT. The value transfer center (Postage Point) uses the key KT to encrypt the data key KD that is to be transmitted and then transfers said data key KD to the server of the payment assurance system (ZinS central system).

From the central payment assurance system, this key is then further distributed to the ZinS local crypto-systems of the local payment assurance systems. These systems likewise have access to the key KT and can thus decrypt the key KD once again. Since the key KT is used to securely protect the key KD during the transport, it is also referred to below as the transport key.

Since all local payment assurance systems receive the same data, it is not necessary to define a separate transport key KT between each local crypto-server and the value transfer center (Postage Point). For security reasons, however, this key KT should be renewed like the data key KD at regular intervals. However, since not as much text is encrypted with this key as with the key KD, a longer exchange interval can be selected. An exchange interval of one or two years is advantageous.

An essential component of this approach is the key exchange of the transport keys KT which, for security reasons, should not take place via the same channel as the exchange of the data keys KD. This exchange is not carried out manually. Since this procedure has to be carried out at regular intervals for several of the local payment assurance systems, another method has to be provided here, by means of which the exchange of the transport keys can likewise be automated.

For this purpose, the ANSI standard X9.17 (Key Management for Financial Services on the basis of symmetrical methods) defines another key level that is referred to as the master transport key (referred to below as KTM). This key has to be installed on the crypto-card under special security precautions and consequently only has to be exchanged at extended intervals. Here, the same KTM is installed on all systems. This key then encrypts the transport keys KT that are thereby distributed and imported in an automated manner via the same channel. The distribution takes place in the same way as the distribution of the data keys. The initialization of the individual systems or of their crypto-cards is described in greater detail in the sections below.

In order to ensure the integrity of the message as well as the authentication of the sender (=Postage Point), a matrix code (MAC) is formed for the individual key messages. In order to generate the MAC, the signature key KS is needed which, like the KTM, is imported during the initialization of the crypto-card. The signature of the data key messages is subsequently carried out with this KS. The confidentiality of the information during the transmission of the messages in the Intranet of the Deutsche Post is thus secured through the use of this strong cryptographic method. Triple DES (key length 168 bits) may be used as a cryptographic method. Hash values are preferably computed by means of the SHA-1 algorithm.

The various periods of validity that exist at the Postage Point and on the crypto-systems of the payment assurance systems have to be taken into account for the distribution and storage of the data keys. A maximum of two keys KD have to be available at the Postage Point at any given point in time, namely, one key that is currently valid and another key with which newly generated postage amounts are to be encrypted ($KD_{new}$).

In the 'exchange' mode of operation of the existing key with the key ($KD_{new}$), the new key is transmitted to the crypto-systems of the payment assurance systems. Once this key has successfully been imported by all of the crypto-systems of the local payment assurance systems, a release message of the ZinS central system is generated and, as of this point in time, $KD_{new}$ is used for the encryption of new postage amounts in the Postage Point. As of this point in time, the old KD should be deleted from the Postage Point and should not be used any more for the generation of new postage amounts.

The situation is different with the crypto-systems of the local payment assurance systems: since a downloaded postage amount can be used for a predefinable period of time of, for example, three months, in order to produce postage indicia, there are several keys KD that have to be available for verifying the postage indicia.

Moreover, when it comes to the distribution of the keys, it should also be taken into consideration what happens to keys that could not be imported into some of the crypto-systems and could therefore not be activated at the Postage Point. It is possible that these keys were imported into other crypto-systems and, as a matter of principle, should be taken into consideration there during future verifications.

In order to reach a uniform condition, which allows a clear versioning of the keys as well as the simplest possible system maintenance, the following execution form of the method of key distribution may be used:

a) Data keys are transmitted in encrypted form with an unambiguous key ID (key phase indicator), an ambiguous generation counter and an end date for the valid preceding data key.

The generation counter serves to distinguish erroneous multiple loading attempts from desired updates of the symmetrical data keys (ensuring transaction security, see g)).

b) Each transmission of a data key from the value transfer center (Postage Point) should be acknowledged by the central payment assurance system by means of a confirmation message.

c) If the acknowledgement is positive, the data key has been successfully installed in all local payment assurance systems and can be issued to the customers using PC franking.

In this case, the generation counter is increased by one for the transmission of a succeeding data key.

d) If the acknowledgement is negative, the data key has not been successfully installed in all local payment assurance systems and should not be issued by the value transfer center to customer systems meant for the production of postage indicia, since otherwise there is a risk of a mass diverting of valid mailpieces.

In this case, the generation counter is not increased by one for the transmission of a succeeding data key, that is to say, it remains at the value of the preceding transmission.

e) If there is no acknowledgement, in the interim, the value transfer center (Postage Point) cannot start any further key transmission to the central payment assurance system (ZinS central) (such attempts would, of course, be ignored by the payment assurance system, but should also be blocked in the value transfer center).

f) If an acknowledgement by the payment assurance system is absent for a prolonged period of time (time-out exceeded), then the value transfer center (Postage Point) can trigger an alarm via its direct or indirect user interface.

g) As soon as a crypto-card receives a data key, it deletes all of the data keys that have the same generation counter value as the most recent transmission. This ensures that, in case of error-related multiple transmission, keys that could previously only be successfully loaded onto some of all of the crypto-cards are deleted. This allows a transaction-secure key transmission.

h) On the crypto-cards in the local payment assurance systems, a routine is invoked repeatedly, preferably regularly, especially daily, that deletes the data keys that are no longer needed. A data key is deleted (in an advantageous embodiment in addition to Point g)) when the end date stored for the succeeding data key in the CKA_END_DATE attribute is smaller than the current system date.

i) When it comes to the end date of the preceding key, a grace period (as short as possible) should be planned since postage indicia produced with an expired postage amount are still recognized as being valid for two more days after the end of their validity when they are checked in the area of the local payment assurance system. Moreover, a time-lag between the production and the release of the new data key also has to be taken into account.

Figure 2:
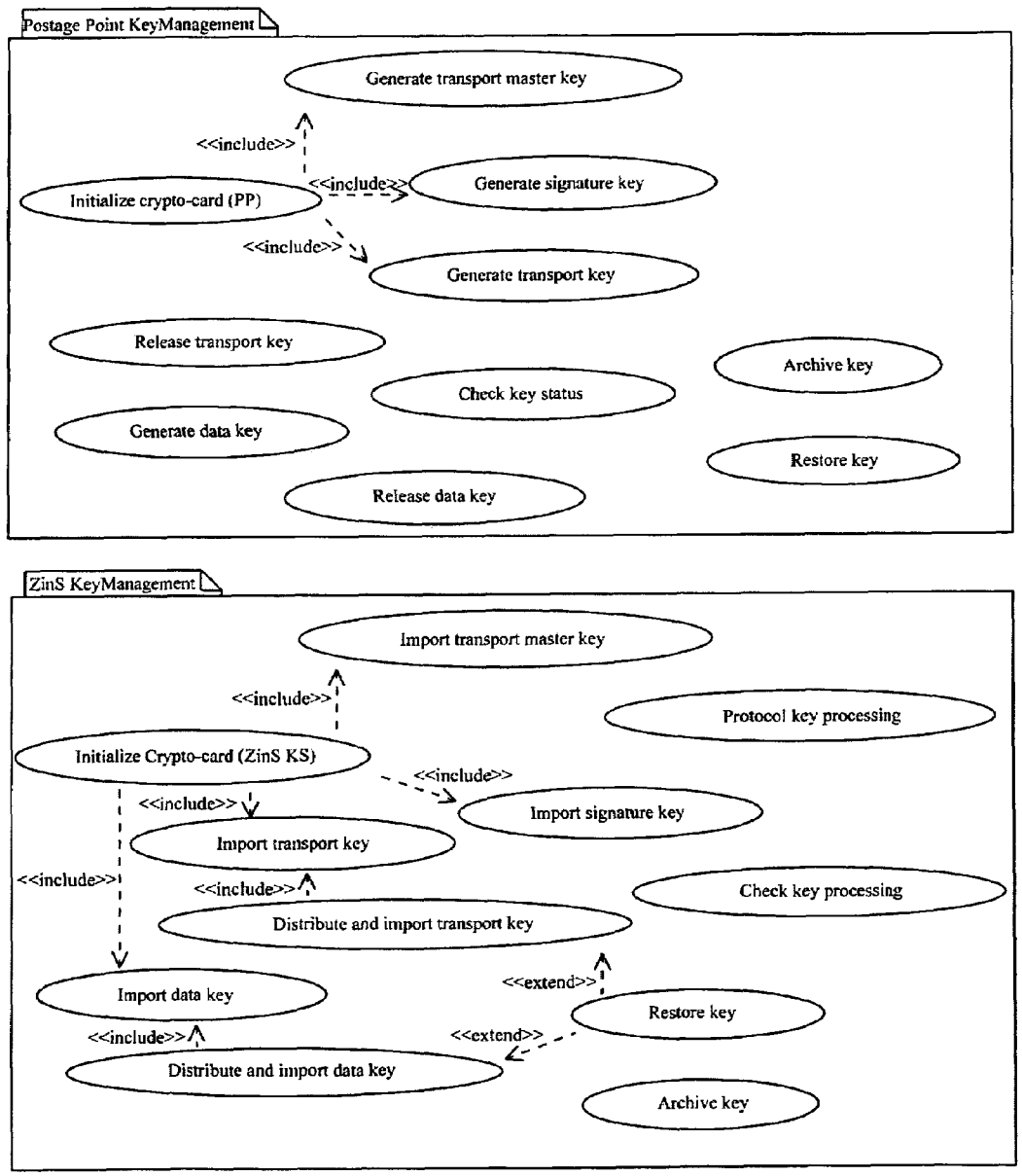
FIG. 2 is a schematic diagram of application cases of a key distribution system according to the disclosure.

FIG. 2 shows an overview of areas of application of the presented key management and its use in the area of payment assurance.

The application cases are described in greater detail below.

Subsequently, details about the described key management method will be presented.

The described applications are presented by way of an example with the use of crypto-cards.

First of all, the way in which the crypto-cards are initialized in the area of the value transfer center is presented:

installation and configuration of the card, uploading the card firmware, insofar as the manufacturer has not already done so. The functionality of the firmware was expanded by embedded code (proprietary software routines) and, for security reasons, the PKCS#11-specific (Public-Key Cryptography Standards) key routines (generation, deletion, etc.) should be blocked for the user. Thus, a higher key security is ensured on the card.

definition of clusters (with several crypto-cards)

Generation and storage of a local master key LMK. The LMK should be distributed over at least three components of which two components are especially advantageous for recreating or newly initializing crypto-server cards. Preferably, each of the components is written onto Smart-Cards with PIN protection, whereby the security administrators receive a SmartCard. In addition, backup SmartCards should also be made. Subsequently, the LMK serves as the above-described master transport key KTM.

user administration: deletion of the default security administrator and definition of the security administrators including the requisite authentication rules (SmartCard-based)

generation of an initial signature key KS, encryption (wrapping) with the KTM and storage as a file. The later copying of this file onto a diskette should be possible (access to the file/diskette should only be possible for the security administrators).

generation of a first transport key KT, creation of the appertaining key message and storage of the message in a file as well as later copying of this file onto a diskette (access should only be possible for the security administrators).

Generating the Transport Master Keys

New transport master keys (KTM) are preferably generated in the manner described below. The local master key (LMK) of an appertaining confirmation card serves as the KTM. For security reasons, the LMK should be divided into at least three components, of which at least two components are needed for re-importation.

The individual components are stored on SmartCards, whereby each security administrator receives a SmartCard and secures it with an individual PIN. Keeping the PIN secret and storing the SmartCards in a safe place is to prevent unauthorized persons from being able to access them.

In order to implement the transport master keys, there are preferably at least two LMK components—corresponding to two different authorization cards—so that an automated implementation of a dual control principle is carried out.

The KTM has to be a Triple DES key. The ID attribute of the key may include a type identification and an unambiguous number.

Type Identification: KT

Unambiguous number: 01 to 99.

Length: fix 4 bytes is filed as CK_CHAR[ ].

As a matter of principle, various security mechanisms are suitable for ensuring that only authorized persons are able to carry out an exchange of the keys. The embodiment described below using signature keys, however, is particularly advantageous since it accounts for especially high security against manipulation.

The signature key secures the integrity of the key messages. It can also be used before the import of the key to ascertain whether the sender of the key messages is the Postage Point. The generation of the signature key should only be possible by a security administrator who is registered via a SmartCard. This should be a TDES key that has the security attributes 'sensitive' set to TRUE and 'extractable' set to FALSE in order to prevent the key plain text from being discovered outside of the card. The ID attribute of the key consists of a type identification and an unambiguous number.

Type identification: KS

Unambiguous number: 01 to 99.

Length: fix 4 bytes is filed as CK_CHAR[ ].

In order for the key to be exported, it has to be wrapped with the KTM and it is then stored as a file on a diskette. The diskette has to be kept in a secure place and serves for the initialization of the crypto-server cards. The integrity of the key file is ensured by a processing routine preferably stored in the cards that is used for the wrapping.

Preferred attributes of the transport key KS are compiled in the following table.

| Attributes of the transport key KS | |
|---|---|
| KeyAttribute | Value |
| CKA_ID | KS + consecutive unambiguous number (KS01 to KS99) for unambiguous designation of the key. |
| CKA_LABEL | Is not filled, corresponds to the default value of the hardware at the time of the generation. |
| CKA_START_DATE | Date as of which the key is supposed to be valid in the PKCS#11 format (is specified by the security administrator) |
| CKA_END_DATE | Date after which the preceding key is to be deleted. |
| CKA_SENSITIVE | TRUE |
| CKA_EXTRACTABLE | FALSE |
| CKA_ENCRYPT | TRUE |
| CKA_DECRYPT | TRUE |

The random number in the LABEL attribute serves to confirm the successful import into the crypto-server cards. A hash value (for example, by means of SHA-1) is formed for this random number and it is used for confirming the successful import as well as for releasing the transport key.

The CKA_ID and CKA_LABEL attributes are to be filled as CK_CHAR. All further attributes are defined in the type via the pkcs11.h file.

The signature key is encrypted with the KTM (=LMK, CKM_KEY_WRAP_WEBSENTRY mechanism) and is uploaded onto the hardware on site like the LMK.

The generation of the transport key will be described below.

In this application case, a transport key including the appertaining key message is generated. Preferably, the key generation module is configured in such as way that the generation of the transport key and/or of the appertaining key message can only be initiated by a security administrator. The exchange interval should be one or two years.

The transport key, in turn, is a TDES key with the following attribute settings:

| Attributes of the transport key KT | |
|---|---|
| KeyAttribute | Value |
| CKA_ID | KT + consecutive unambiguous number (KT01 to KT99) for unambiguous designation of the key. |
| CKA_LABEL | Random value having the length of 64 bytes that was generated using the PKCS#11 C_GenerateRandom method. |
| CKA_START_DATE | Date as of which the key is supposed to be valid in the PKCS#11 format (is specified by the security administrator) |
| CKA_END_DATE | Date after which the preceding key is to be deleted. |
| CKA_SENSITIVE | TRUE |
| CKA_EXTRACTABLE | FALSE |
| CKA_ENCRYPT | TRUE |
| CKA_DECRYPT | TRUE |

The random number in the LABEL attribute serves to confirm the successful import into the crypto-server cards. A hash value (for example, by means of SHA-1) is formed for this random number and it is used for confirming the successful import as well as for releasing the transport key.

The CKA_ID and CKA_LABEL attributes are to be filled as CK_CHAR [ ]. All further attributes are defined in the type via the pkcs11.h file.

The transport key is encrypted with the KTM (=LMK, CKM_KEY_WRAP_WEBSENTRY mechanism) and a message having the following structure is formed for the transmission from the value transfer center to the central payment assurance system:

| Item | Length | Byte no. | Designation | Description |
|---|---|---|---|---|
| 1 | 2 | f1-f2 | MsgType | Identification of the key message, constant 'KT' |

-continued

| Item | Length | Byte no. | Designation | Description |
|------|--------|----------|-------------|-------------|
| 2 | 1 | f3 | Version | Version of the structure of the message, 1 byte starting with the value '01' |
| 3 | 4 | f4-f8 | KeyID | ID of the transport key in plain text |
| 4 | 4 | f9-f12 | SigKeyID | ID of the key used for the signature |
| 5 | n – 13 | f13-$f_{n1}$ | TranspKeyEncrypt | Result of the encryption (wrap) of the transport key |
| 6 | 24 | $f_{n+1}$-$f_{n+24}$ | MAC | MAC for the key message; is formed in that an SHA-1 hash value is formed for the Fields 1 to 5 of the message, and this hash value is encrypted with the signature key (CKM_DES3_CBC_PAD mechanism, the IV is filled up with zeros; ID see field 5). |

Subsequent to the further distribution, this transport key message is transferred to the ZinS central server. The interface is realized as a Session Bean, this service is looked up by means of a naming service (Java Naming and Directory Interface—JNDI). The method for the transport should expect the above-mentioned data block.

Moreover, the message is stored at the Postage Point as a file so that the security administrators can later store it onto one or more diskettes that are to be kept in a safe place. The diskettes are then used for the initialization of new crypto-server cards.

The value transfer center is configured in such a way that it can release the transport key KT. In order to release the transport key KT, there is an interface via which the central value transfer center can release this transport key once it has successfully been distributed and successfully imported into all local payment assurance systems (ZinS crypto-systems). Only through the release is the appertaining transport key used subsequently for the encryption of data keys (KD).

The interface is realized as a Session Bean. This service is looked up by means of a naming service.

The data structure for the releasing procedure preferably has the following parameters:

| Item | Length | Byte no. | Designation | Description |
|------|--------|----------|-------------|-------------|
| 1 | 4 | f1-f4 | KeyID | ID of the transport key in plain text |
| 2 | 201 | f4-f24 | RandomHash | SHA-1 hash value of the random number that was transferred as the LABEL attribute of the transport key |
| 3 | 1 | f25 | State | Result of the encryption: true = processing necessary, release can take place false = processing not successful |
| 4 | 128 | f26-f153 | Message | Detailed message about the error causes, or detailed success message |

The authentication of the key allocation system of the payment assurance system (ZinS KeyManagement system) vis-à-vis the PP KeyManagement system is carried out via Parameter 2. This is a hash value that is formed using the SHA-1 method from the LABEL attribute of the transport key. The LABEL attribute is filled with a random value at the time of the generation of the transport key. Since the transport key and all of its attributes are encrypted during the transmission, only the ZinS crypto-server can compute the correct hash value.

If the transmitted hash value is identical to the hash value of the KT computed for the LABEL attribute, whereby said hash value is located on the Postage Point WebSentry module, and if the transmitted processing status=true, then the transport key is activated. This means that subsequently, the data key messages are encrypted with the transport key.

A variant of this application case exists if the processing is erroneous (transmitted status=false). In this case, the status for this key generation and key distribution is protocolled and the appertaining transport key is deleted accordingly.

A data key including the appertaining key message may be generated. Preferably, the key allocation system is configured in such a way that this action can only be initiated by a security administrator. This should be done every three months. If a data key KD is in circulation for which no feedback (release or error) has yet been received from the central payment assurance system (ZinS central system), then the generation of new KDs is blocked until the feedback has been received.

The data key (KD) serves for the encryption of certain matrix code contents and also ensures that no valid postage indicia can be produced for which no payment has been made to the postal service provider. This data key serves to verify the digital postage indicia at the ZinS crypto-servers. The data keys are likewise TDES keys that are generated using the PKCS#11 function C_GenerateKey and that have the following attributes:

| Attributes of the data key KD | |
|---|---|
| KeyAttribute | Value |
| CKA_ID | Consecutive unambiguous number (e.g. 01) for unambiguous designation of the key (without a prefix); corresponds to the key phase indicator that is encoded in the postage indicium and in the PostageID. |
| CKA_LABEL | 1st Byte: Generation counter for simplified deletion of keys in the ZinS crypto-systems that could not be activated<br>Bytes 2-65: random value having the length of 64 bytes that was generated using the PKCS#11 C_GenerateKey method. |
| CKA_START_DATE | Date as of which the key is supposed to be valid in the PKCS#11 format (is filled with the current date) |
| CKA_END_DATE | Does not indicate the end of the validity of the key itself but rather the end of the validity of the predecessor. The date after which the preceding key is to be deleted. |
| CKA_SENSITIVE | TRUE |
| CKA_EXTRACTABLE | FALSE |
| CKA_ENCRYPT | TRUE |
| CKA_DECRYPT | TRUE |

The values for the CKA_ID attribute and the generation counter are prescribed by the system. The CKS_ID is always counted upwards by one, whereas the generation counter is only increased when the key release has been successful. The CKA_ID and CKA_LABEL attributes are to be filled as CK_CHAR [ ]. All further attributes are defined in the type via the pkcs11.h file.

The random number in the LABEL attribute serves to confirm the successful import into the crypto-server cards. A hash value is formed (by means of SHA-1) for this random number and it is used for confirming the successful import as well as for releasing the transport key.

The generation of a message for the exchange of the data key is somewhat more complex and comprises the following sequence:

1. The data key is encrypted with the KTM (=LMK, CKM_KEY_WRAP_WEBSENTRY mechanism). This has the advantage that all of the attributes of the key (among others, CKA_EXTRACTABLE=false) are concomitantly encrypted and are set correctly again at the time of the decryption. With this encrypted byte sequence, an interim message with the following structure is formed:

| Structure of an interim message for data key KD | | | | |
|---|---|---|---|---|
| Item | Length | Byte no. | Designation | Description |
| 1 | n | f1-n | DataKeyEncrypt | Result of the encryption (wrap) of the data key KD with the special WebSentry mechanism (key KTM) |

2. The interim message, in turn, is encrypted with the active transport key KT making use of the CKM_DES3_CBC_PAD mechanism (the initialization vector IV is filled with zeros).
3. The message to be distributed is formed and it has the following structure:

| Structure of the distribution message for the data key KD | | | | |
|---|---|---|---|---|
| Item | Length | Byte no. | Designation | Description |
| 1 | 2 | f1-f2 | MsgType | Identification of the key message, constant 'KT' |
| 2 | 1 | f3 | Version | Version of the structure of the message, 1 byte starting with the value '01' |
| 3 | 1 | f4 | KeyID | ID of the data key in plain text |
| 4 | 2 | f5-f7 | KeyGeneration | Generation counter in plain text, e.g. '01' |
| 5 | 4 | f8-f12 | SigKeyID | ID of the key used for the signature |
| 6 | 4 | f12-f16 | KTID | ID of the transport key used for the encryption of the interim message |
| 7 | n | f16-$f_n$s | HelperMsgEncrypt | Result of the encryption of the interim message |
| 8 | 24 | $f_{n1+1}$-$f_{n1+24}$ | MAC | MAC for the interim message; is formed in that an SHA-1 hash value is generated for the Fields 1-7 of the message and this hash value, provided with the signature key (CKM_DES3_CBC_PAD |

-continued

Structure of the distribution message for the data key KD

| Item | Length | Byte no. | Designation | Description |
|---|---|---|---|---|
| | | | | mechanism, the IV is filled with zeros; ID see field 5), is encrypted. |

4. Subsequently, the data key message is transferred for further distribution to the ZinS central server. Moreover, it is stored by the security administrators onto one or more diskettes that have to be kept in a secure place so that they can be used for the initialization of new ZinS crypto-server cards.

The advantage of the double encryption of the message content is that less cipher text has to be transmitted to the KTM via the Intranet and consequently, crypto-analysis of this key is rendered much more difficult.

For purposes of releasing the data key KD, an interface and a protocol mechanism are provided by means of which the release of the data key is protocolled. The central payment assurance system is preferably configured in such a way that the data key is only released after the successful distribution and successful import of a data key into the crypto-systems of the local payment assurance systems. Only through this release is the appertaining data key subsequently used for the encryption of crypto-strings that are to be incorporated into the postage indicia and then the appertaining key identification information KeyID is encoded in the identification information (PostageID) of postage amounts.

The interface is realized via CWMS (computerized work management systems) between the central payment assurance system (ZinS central) and the local payment assurance system (ZinS local). The value transfer center (Postage Point) PP receives the information via the appropriate bean. The data structure for the releasing procedure has the following contents:

Structure of the method for releasing data keys KD

| Item | Length | Byte no. | Designation | Description |
|---|---|---|---|---|
| 1 | 1 | f1 | KeyID | ID of the data key in plain text |
| 2 | 20 | f2-f22 | RandomHash | SHA-1 hash value of the random number that was transmitted as the LABEL attribute of the data key |
| 3 | 1 | f23 | State | Result of the encryption: true = processing successful, release can take place false = processing not successful |
| 4 | 128 | f23-f151 | Message | Detailed message about error causes, or detailed success message |

The authentication of the key allocation system of the payment assurance system vis-à-vis the key allocation system of the value transfer center PP is carried out via parameter 2. This is preferably a hash value that is formed using the SHA-1 method from the LABEL attribute of the data key. The LABEL attribute is filled with the random value at the time of the generation of the data key. Since the data key and all of its attributes are encrypted during the transmission, the correct hash value can only be computed by the crypto-server of the payment assurance system.

If the transmitted hash value is identical to the hash value of the KD that has been computed for the LABEL attribute and is located on the Postage Point-WebSentry module, and if the transmitted processing status=true, then the data key is activated. This means that subsequently, the crypto-strings for the postage indicia/postage amounts are encrypted with this data key. When a data key is activated, the generation counter of the signature key is increased by one.

A variant of this application case exists if the processing is erroneous (transmitted status=false). In this case, the status for this key generation and key distribution is protocolled and the appertaining data key is correspondingly deleted on the card. In this case, the generation counter is not increased by one.

Preferably, the key allocation systems contain a status memory to store the executed key generations. As long as no feedback has been received from the central payment assurance system (ZinS central system) about the executed key distribution, the status is displayed as open. After the successful feedback and distribution, the key is designated as having been activated. In case of error, the transmitted status message is displayed. In case of errors or the prolonged absence of a release message, an error investigation routine is invoked.

It is advantageous to perform an archiving of the keys. A preferred archiving of the keys in the area of the value transfer center will be described below. In order to secure the keys, the security administrator can start an archiving function that encrypts all of the keys (except for KTM) with the KTM (CKM_KEY_WRAP_WEBSENTRY mechanism) and returns them. These keys should be securely stored in the database or in a secure file system area.

After the successful archiving, all of the keys are deleted that have exceeded their initial validity date by more than six months and are no longer active.

Keys are restored—especially in the area of the value transfer center PP—in that the archived key data is decrypted again (unwrapped) and stored on the card. The mechanism used is once again CKM_KEY_WRAP_WEBSENTRY.

After a key has been decrypted, a key with the same key identification information KeyID that already exists on the card is deleted.

Through special security measures of the WebSentry card and through the distribution onto several SmartCards, the master transport key KTM is reliably secured against being compromised.

If nevertheless an exchange of the master transport key is to be made, then analogous to the application case involving an initialization of a "crypto-card" (PP), a new KTM as well as new signature keys, transport keys and data keys have to be generated.

The prior KTM remains on the card as a so-called "dormant LMK" and has to be appropriately deleted by the security administrator.

Preferred application cases of the key allocation system will be described below. The presentation also applies to applications in all areas of the payment assurance system. This is especially advantageous if individual components are implemented preferably in the area of the local payment assurance system or of the central payment assurance system. However, use in each of the other payment assurance system is likewise possible.

A first application case is the initialization of the crypto-card in the area of the payment assurance system.

In order to initialize the crypto-card, the following basic configurations are to be undertaken, whereby most of the functionality can be managed via a management tool (WebSentryManager):

- installation and configuration of the card, uploading the card firmware, insofar as the manufacturer has not already done so. The firmware contains the Embedded Code (proprietary software routines) (the latter functionality is integrated into the WebSentryManager)
- definition of clusters (with several crypto-cards) (WebSentryManager)
- import of the transport master key (KTM), see separate application case (functionality is provided by the WebSentryManager)
- user administration: deletion of the default security administrator and definition of the security administrators including the requisite authentication rules (SmartCard-based)
    - Generation of two "normal" users (one for key verification/one for key import) that authorize themselves via a predefined PIN.
    - The functionality of the user administration is likewise provided by the WebSentryManager.
- import of the signature keys (KS); see separate application case
- import of the transport keys (KT); see separate application case
- optionally also import of the data keys (KD); (likewise see their own application case) insofar as they have already been generated.

Here, the keys have to be imported in the above-defined sequence. The card can be initialized at a central place, whereby the complete crypto-system computer has to be initialized and subsequently has to be sent. This is because the WebSentry card deletes the internal memory as soon as it is pulled out of the PCI slot.

Preferably, the transport master key can only be imported by at least two security administrators who have locally identified themselves vis-à-vis the crypto-system by means of a SmartCard reader and the associated SmartCards. Due to the importance of the key KTM, this key can only be imported onto the card using the dual control principle. This means that at least two of the PIN-protected SmartCards that were generated in the application case "transport master key" are needed for the import.

Since the master transport key KTM can only be loaded onto the card using both SmartCards and since the key use is PIN-protected, it is ensured that this key can only be installed onto the card using the dual control principle. This provides a very high level of protection against the key being breached.

This functionality is provided via the management tool WebSentryManager. This management tool makes it possible to load a so-called local master key (LMK corresponds to the KTM described in this concept) via SmartCards and to store them in a secure storage area of the card.

The LMK may be distributed onto three SmartCards, whereby all three parts are needed in order to import the LMK onto the crypto-hardware. In this case, three security administrators are needed for importing the master transport key KTM.

The signature key ensures the integrity of the key messages; it can also be used before the import of the key to determine whether the sender of the key message is the value transfer center (Postage Point). The signature key can be generated in different ways. The appertaining key message is stored by the administrator onto a diskette and, through this application case, is imported onto a crypto-card of the payment assurance system that is to be initialized.

In order to import the key, the key message stored on the diskette is decrypted with the master transport key KTM (PKCS#11 function C_Unwrap, CKM_KEY_WRAP_WEBSENTRY mechanism). The integrity of the key message is automatically checked by this routine. If a key with this KeyID already exists, it is subsequently deleted.

For the further transport of the transport key messages, the server of the central payment assurance system provides an interface via which the distribution and the subsequent import into the crypto-systems of the individual local payment assurance systems can be initiated.

The interface is realized as an RMI service. This service is looked up by means of a naming service (JNDI). The distribution is carried out via the CWMS (computerized work management system) used for the distribution of the P/N list.

If a new distribution job is created, the key message is forwarded to all of the currently registered crypto-systems and a protocol entry is written for each case. The management of the crypto-systems is carried out via an application case of the payment assurance system.

The receipt of new key messages is checked at the individual crypto-systems by an ImportController at regular intervals (as a function of the distribution mechanism). When a new message is received, the application case "import transport key" is automatically launched. The return value of this action is checked. If a negative feedback is received, then the import attempt is repeated up to three times.

If the import is still not possible after three attempts, then a protocol message about the failure is sent to the ZinS central system (once again as a function of the transport mechanism). If the import was successful, a positive protocol message is issued.

The protocol messages are processed centrally via the application case "protocol key processing". The release of the transport key is also triggered accordingly.

The import of the transport keys is either carried out by a security administrator who initializes the crypto-system on site or else this import is triggered automatically by the ImportController of the key distribution when the ImportController receives a new transport key message. The key is preferably imported according to the following process steps:

1. A registration on the card is carried out with the ID and PIN belonging to the KeyImport user.
2. A hash value is formed for Fields 1-5 of the transport key message using the SHA-1 method.
3. The signature key is ascertained that owns the KeyID that was indicated in Field 4.
4. This key is used to encrypt the hash value formed under Point 2 (CKM_DES3_CBC_PAD mechanism, the initialization vector IV is filled with zeros) and compared to Field 6. If these two values match, the integrity is ensured and it is assured that the message was created by the PC franking system.
5. The content of Field 5 of the message is decrypted with the KTM (C_UnwrapKey method, CKM_KEY_WRAP_WEBSENTRY mechanism). As a result, the appropriate transport key object is generated automatically and stored on the card. In addition, the mechanism once again implicitly checks the integrity of the key as well as the correct sender.
6. If a key with the same KeyID already exists on the card, it is deleted.
7. A hash value is formed for the LABEL attribute of the newly imported key using the SHA-1 method and this is returned together with the KeyID and the positive message as the return value.
8. The user session is ended.
9. A protocol message is created from the return values and it is sent to the ZinS central system.
10. Any failed attempts stored for this KeyID (see variant described below) are reset.

A variant of this application case is that one of the routines or the checking of the MACs fails. In this case, further processing is aborted and a return value is returned containing the KeyID, the error code as well as an error message. For the KeyID, the stored number of failed attempts is increased by one. Once this number has reached three, a protocol message is created from the most recently transferred return value and sent to the central payment assurance system.

In case of manual initiation, the result of the import is additionally displayed on the monitor of the security administrator.

Preferably, steps 2 to 7 run directly in the card software (embedded code). This increases the performance as well as the security against being breached.

For the further transport of the data key messages, the server of the central payment assurance system provides another interface by means of which the distribution and the subsequent import of the data keys into the individual crypto-systems of the local payment assurance systems take place.

The interface is realized as a Session Bean; this service is looked up by means of a naming service (Java Naming and Directory Interface—JNDI).

The distribution is carried out via the CWMS (computerized work management system) used for the distribution of the P/N list.

If a new distribution job is created, the key message is forwarded to all of the currently registered crypto-systems and a protocol entry is written for each case. The crypto-systems is managed via an allocation system. If a distribution job for a data key is already in circulation for which no feedback has been received at the value transfer center PP, then the acceptance of further distribution jobs for data keys is rejected until the point in time of the feedback.

The receipt of new key messages is checked at the individual crypto-systems by an ImportController at regular intervals (as a function of the distribution mechanism). When a new message is received, the application case "import transport key" is launched automatically. The return value of this action is checked. If a negative feedback is received, then the import attempt is repeated up to three times.

If the import is still not possible after three attempts, then a protocol message about the failure is sent to the ZinS central system (once again as a function of the transport mechanism). If the import was successful, a positive protocol message is issued.

The protocol messages are processed centrally via the application case "protocol key processing". The release of the transport key is also triggered by this application case.

The import of the data keys is either carried out by a security administrator who initializes the crypto-system on site or else this import is triggered automatically by the ImportController of the key distribution when the ImportController receives a new data key message.

The key is imported analogously to the import of the transport key, taking into account the special features of a data key message:
1. A registration on the card is carried out with the ID and PIN belonging to the KeyImport user.
2. A hash value is formed for Fields 1-7 of the data key message using the SHA-1 method.
3. The signature key is ascertained that owns the KeyID that was indicated in Field 5.
4. This key is used to encrypt the hash value formed under Point 2 (CKM_DES3_CBC_PAD mechanism, the initialization vector IV is filled with zeros) and compared to Field 8. If these two values match, the integrity is ensured and it is assured that the message was created by the PC franking system.
5. The transport key is ascertained that owns the KeyID that was indicated in Field 6.
6. The content of Field 7 of the message is decrypted with the key ascertained under Point 5 (C_Decrypt method, CKM_DES3_CBC_PAD mechanism, the initialization vector IV is filled up with zeros). The result of the decryption is an interim message.
7. The content of Field 1 of the interim message is decrypted with the KTM (C_UnwrapKey method, CKM_KEY_WRAP_WEBSENTRY mechanism). As a result, the appropriate data key object is generated automatically and stored on the card. In addition, the mechanism once again implicitly checks the integrity of the key as well as the correct sender.
8. If a key with the same KeyID already exists on the card, it is deleted.
9. All of the data keys on the crypto-card are read and checked as to whether the value of the generation counter in the LABEL attribute, byte 1, is the same as the newly imported key. If this is the case, these keys are removed from the card. These are keys that—due to an error in the import into a crypto-system of another local payment assurance system—were not released on the value transfer center PP.
10. A hash value is formed for bytes 2-65 of the LABEL attribute of the newly imported key using the SHA-1 method and this is returned together with the KeyID and the positive message as the return value.
11. The user session with the crypto-card is ended.
12. A protocol message is created from the return values and it is sent to the ZinS central system.
13. Any failed attempts stored for this KeyID (see variant described below) are reset.

A variant of this application case is that one of the routines or the checking of the MACs fails. In this case, further processing is aborted and a return value is returned containing the KeyID, the error code as well as an error message. For the KeyID, the stored number of failed attempts is increased by one. Once this number has reached three, a protocol message is created from the most recently transferred return value and it is sent to the central payment assurance system (ZinS central system).

In case of manual initiation, the result of the import is additionally displayed on the monitor of the security administrator.

Preferably, steps 2 to 10 run directly in the card software (embedded code). This increases the performance as well as the security against being breached (especially of the initialization vectors IV as well as of the KTMs).

A cleanup of the data keys is carried out repeatedly, preferably regularly, on as many crypto-systems of the payment assurance system as possible, preferably on all of them, and serves to delete data keys that are no longer needed.

Procedure of the Data Key Cleanup
1. All of the data keys KD located on the card are ascertained and sorted in ascending order according to their ID (CKA_ID attribute).
2. For each key of this list, the following checking procedures are carried out:
    I. The successor of the key is determined (next-larger ID).
    II. If present, the following is verified:
        1. whether the CKA_END_DATE attribute of the successor indicating the end of the validity of the predecessor is smaller than the current system date. If this is the case, then the currently processed key of the list is deleted.
        2. whether the generation counter of the successor (byte 1 of the CKA_LABEL attribute) is identical to the generation counter of the currently processed key. If this is the case, then the currently processed key of the list is deleted.

The key processing is preferably protocolled on the server of the central payment assurance system (ZinS central server). The keys that are protocolled by this application case are the transport key and the data key.

For each distribution job, a protocol is drawn up indicating to which active crypto-system the key message was sent. For each system and each distribution job, a separate entry is generated that is first set at the status "sent".

After each successful but also after each unsuccessful key processing, the individual crypto-systems generate a protocol message and send it to the central payment assurance system (ZinS central system). This distribution either takes place via JMS queues or by database replication.

In the area of the central payment assurance system, after the messages have been received, they are used to update the above-described protocol entries. For this purpose, the status "processing successful"/"not successful" as well as possibly an error code and the message are stored.

Following the processing of the protocol messages, it is checked whether distribution jobs exist that were successfully incorporated by all of the crypto-systems. If this is the case, then the release of each appertaining key, especially in the area of the value transfer center, is initiated. As soon as a system reports an error, a corresponding message with a negative status is generated in the area of the value transfer center.

The fact that the key release has been invoked is noted with the distribution job so that no additional releases are carried out for a given job. As long as the note, however, has not been entered, a new attempt is made at regular intervals to contact the release service.

A special variant is present when, after a period of time to be defined, preferably several days, for example, three days, feedback has not been received yet from all of the crypto-systems. After the expiration of this time, a negative release message is sent to the value transfer center.

Preferably, the key allocation system has a user interface that allows an administrator to check the status of a key distribution job. The following data is then displayed for each distribution job:

the number of systems to which the distribution message was sent the number of systems that have reported back a successful processing the number of systems that have not yet reported back the outcome of the processing the number of systems that have reported back an unsuccessful processing Moreover, a detailed listing can be drawn up in which the current status of each system is displayed.

As an alternative, it is possible to display locally the keys stored on the appertaining card.

It is advantageous for all of the keys for which distribution jobs were generated to be archived in the area of the central payment assurance system. Preferably, no archiving is carried out on the local systems. There, the keys are stored in the non-volatile memory of the card. Only key messages that were also released are archived.

The key restoration of transport keys and data keys can be launched centrally for a specific crypto-system. In this case, the current keys from the archive are ascertained and sent to the specific crypto-system. For this purpose, protocol messages are likewise generated. With this type of key distribution, only the release message is absent.

If the master transport key KTM is lost, then the corresponding crypto-system either has to be sent to the security administrators for new initialization or else the security administrators have to initialize each system on site.

The master transport key KTM is reliably secured against being compromised through special security measures of the WebSentry card and through the distribution onto several SmartCards as well as through the multi-stage key system.

Nevertheless, if an exchange of the master transport key is to take place, a new master transport key KTM as well as new signature keys, transport keys and data keys have to be generated.

These then have to be imported into all of the crypto-systems of the local payment assurance systems. This involves more effort since either all of the crypto-systems have to be transported to the central administration site and back again, or else the security administrators have to travel to all of the sites of the local payment assurance systems. Therefore, the use of the security mechanisms according to the invention for the master transport key KTM is advantageous.

The prior master transport key KTM remains on the card as a so-called "dormant LMK" and has to be appropriately deleted by the security administrator.

The key handling and the decryption should be present on the crypto-card as embedded code. In this manner, not only a greater degree of security is achieved but also a performance improvement of the crypto-system is expected.

Preferably, the crypto-cards contain the standard PKCS#11 functions listed below:
    C_CloseSession
    C_GetSlotList
    C_Init
    C_Initialize
    C_Login
    C_Logout
    C_OpenSession along with the presented extensions. Moreover, permanently stored functions should not contain any further extensions of third parties and the extensions required here are exclusively integrated as functions for crypto-cards of the payment assurance system.

In order to designate the embedded key-handling methods of the PKCS#11 DLL, these methods are given a prefix.

This prefix is defined as CE_. In this case, CE stands for Crypto Extension.

Each embedded method supplies a return value of the type CK_RV, which is defined as a fixed component of the pkcs11.h include file. It is advantageous that, during the implementation of the embedded methods, additional error return values are defined and these are provided in a C++ header file for integration. This measure is advantageous in that, through an invocation of an embedded method, various Pkcs11 methods can be invoked which are nested on the hardware. Another advantage here is the completely newly established key-handling within the software of the crypto-cards.

Example for illustrating the method syntax:

*CK_RV=CE_MethodName(parameter list)*

Within the parameter list, parameters that have to be filled with a result are transferred by means of call by reference. The method name is formed from meaningful word combinations that provide a good idea of what the method does.

The word selection is made in such a way as to allow an association of meaning contents, for example, through the use of English technical terms.

The introduction of two enumeration types serves to verify the functionality of different embedded methods. A distinction is made between the enumeration type for key types and key attributes.

CE_EnumKey={CE_KT,CE_DT,CE_SE,CE_KA}

CE_KA assumes a special position. It is not a key but rather the set of all keys. If this EnumElement is indicated, then the methods implement a functionality that relates to all of the keys contained in the card.

CE_EnumKeyAttribute={CE_ID,CE_LABEL,CE_STARTDATE,CE_ENDDATE}

The necessary defines are to be taken over into the pkcs11.h file. The defined extensions can be located in a separate header file that are enclosed in the pkcs11.h file. Various mechanisms are possible to implement the embedded methods.

In the cryptographic environment, a method is defined that autonomously carries out all of the relevant verifications with the PKCS#11 methods that are available to it.

CK_RV CE_Decrypt (CK_SESSION_HANDLE session,
CK_BYTE [ ] message, CK_BYTE* postageID
CK_BBOOL bOk)

Function Description:

The embedded cryptography method receives a 57-byte long date in the parameter message and this date corresponds to the matrix code of the postage indicium. The counting in the following explanation of the work steps starts at one.

1$^{st}$ Step: Formation of the Initialization Vector IV
  As the initialization vector, the first two bytes are filled with zeros and then bytes f6-f10 plus byte f14 are appended to the matrix code.

2$^{nd}$ Step: Determination of the KD to be Used
  The key phase indicator is contained in byte f14; it indicates which key is to be used. The key phase indicator is stored in the CKA_ID key attribute and thus unambiguously identifies the key. The key handling described further below should allow an efficient finding of the key.

3$^{rd}$ Step: Decryption of the Contained Encrypted Message
  The mechanism employed in CK_MECHANISM is CKM_DES3_CBC. Bytes f15-f38 are decrypted, that is 24 bytes, the first 12 bytes of the decrypted result are output by the parameter postageID. Once the decryption has been carried out successfully, the process continues with Step 4, otherwise with Step 5.

4$^{th}$ Step: Formation and Cleanup of the Hash Value
  A specially constructed 77-byte large data block serves as the basis for the formation of the hash value of the date.
  Bytes 1 to 53: corresponding to the first 53 bytes of the matrix code
  Bytes 54 to 65: corresponding to the first 12 bytes of the current, unencrypted message part (PostageID)
  Bytes 66 to 77: corresponding to the last 12 bytes of the current, unencrypted message part
  The hash value is formed using SHA-1 and, after this procedure, the first four bytes have to match bytes f54-f57. If this is not the case, then the date is not valid. If an error occurs during the execution of the hashing or if there is a discrepancy in the hash value, then the procedure is as in Step 5.

5$^{th}$ Step: Return of the Success Indicator
  The parameter bOk is filled with "true" if all of the work steps were successful, and with "false" if the hash value cleanup has revealed a discrepancy or if one of the Pkcs#11 methods has caused an error. The return value has to accordingly be filled with the error message or with CKR_OK if no error has occurred.

CK_RV DE_VerifyMsg (CK_SESSION_HANDLE session,
CK_BYTE [ ] message, int length,
CK_BBOOL bOk)

A general data block message for the verification procedure is shown below:

| Data block for the verification procedure | | | | |
|---|---|---|---|---|
| Item | Length | Byte no. | Designation | Description |
| 1 | 2 | f1-f2 | MsgType | Identification of the key message, constant 'KT' or 'KD' |
| 2 | 1 | f3 | Version | Version of the structure of the message, 1 byte starting with the value '01' |

-continued

Data block for the verification procedure

| Item | Length | Byte no. | Designation | Description |
|---|---|---|---|---|
| 3 | 2 | f4-f5 | KeyGeneration | Generation counter in plain text, e.g. '01' |
| 4 | 1 | f6 | KeyID | ID of the data key in plain text |
| 5 | 4 | f7-f11 | KeyID | ID of the transport key in plain text |
| 6 | 4 | f12-f16 | SigKeyID | ID of the key used for the signature |
| 7 | 4 | f17-f21 | KTID | ID of the transport key used for the encryption of the interim message (see Item 2) |
| 8 | n − 22 | f22-$f_n$ | TranspKeyEncrypt ------------- ---------- ------------- ----------- HelperMsgEncrypt | KT: result of the encryption (wrap) of the transport key ----------------- ------------- ----------------- ------------- ----------------- ------------- KD: result of the encryption of the interim message |
| 9 | 24 | $f_{n+1}$-$f_{n+24}$ | MAC | KT: MAC for the key message; is formed in that an SHA-1 hash value is formed for the Fields 1 + 2 + 5 + 6 + 8 of the message, and this hash value is encrypted with the signature key (CKM_DES3_CBC_PAD mechanism, the IV is filled up with zeros; ID see item 6). ----------------- ------------- ----------------- ------------- KD: MAC for the key message; is formed in that an SHA-1 hash value is formed for the Fields 1 + 2 + 4 + 3 + 6 + 7 + 8 of the message, and this hash value is encrypted with the signature key (CKM_DES3_CBC_PAD mechanism, the IV is filled up with zeros; ID see item 6). |

Unused fields are filled up with zeros. The mode of operation of the method is determined via the parameter MsgType.

A generated data block is transferred in message for the MsgType KT and KD. The data block is filled up with each of the received messages.

The function allocation CE_VerifyMsg KT for the MsgType KT receives the complete transport key message in the MESSAGE attribute, and its length in the LENGTH attribute. This embedded message serves to ensure the integrity of the transport key message at the recipient. In order to actuate the verification, the following steps have to be performed:

1$^{st}$ Step: Formation of the Initialization Vector IV
   The initialization vector is filled with zeros.

2$^{nd}$ Step: Decryption of the Received Encrypted Message
   The mechanism used in CK_MECHANISM is CKM_DES3_CBC_PAD. The bytes of the variable MAC field are decrypted. If an error occurs during the decoding, then the procedure is as in Step 4.

3$^{rd}$ Step: Cleanup of the Hash Value
   In order to form the hash value of the date, a hash is formed from the Fields 1+2+5+6+8 of the transport key message and it is compared to the hash of Step 2. The hash value is formed using SHA-1. If the hash values are not identical, then the date is not valid. If an error occurs during the execution of the hashing or if there is a discrepancy in the hash value, then the procedure is as in Step 4.

4th Step: Return of the Success Indicator

The parameter bOk is filled with "true" if all of the work steps were successful, and with "false" if the hash value cleanup has revealed a discrepancy or if one of the Pkcs#11 methods has caused an error. The return value has to be filled accordingly with the error message or with CKR_OK if no error has occurred.

After the function allocation CE_VerifyMsg for the Msg-Type KD, the complete data key message is transferred in the MESSAGE attribute, and its length in the LENGTH attribute. This serves to ensure the integrity of the transport key message at the recipient. In order to actuate the verification, the following steps have to be performed:

1st Step: Formation of the Initialization Vector IV

The initialization vector is filled with zeros.

2nd Step: Decryption of the Received Encrypted Message

The mechanism used in CK_MECHANISM is CKM_DES3_CBC_PAD. The bytes of the variable MAC field are decrypted. If an error occurs during the decoding, then the procedure is as in Step 4.

3rd Step: Cleanup of the Hash Value

In order to form the hash value of the date, a hash is formed from the Fields 1+2+4+3+6+7+8 of the data key message and it is compared to the hash of Step 2. The hash value is formed using is carried out using SHA-1. If the hash values are not identical, then the date is not valid. If an error occurs during the execution of the hashing or if there is a discrepancy in the hash value, then the procedure is as in Step 4.

4th Step: Return of the Success Indicator

The parameter bOk is filled with "true" if all of the work steps were successful, and with "false" if the hash value cleanup has revealed a discrepancy or if one of the Pkcs#11 methods has caused an error. The return value has to be filled accordingly with the error message or with CKR_OK if no error has occurred.

These embedded key-handling methods should comprise the key import of a wrapped key and an efficient key management. Keys of the type KS, KD and KT should be imported.

```
CK_RV CE_ImportKey (CK_SESSION_HANDLE session,
    CK_BYTE_PTR data,
    CK_ULONG length, CK_BYTE* HashValue,
    CE_EnumKey KeyType,
    CK_CHAR [ ] KeyKTID)
```

The function allocation CE_ImportKey is preferably carried out as described below:

The CKM_KEY_WRAP_WEBSENTRY mechanism is used for the wrapping. Accordingly, the same mechanism is needed for the unwrapping. The key obtained is imported into the crypto-hardware by the unwrapping, whereby a key that is imported a second time, that is to say, with the same key phase, overwrites the old key.

The wrapped key is transferred to the DATA parameter and its length in the LENGTH parameter. The length of the key depends on the filling of the key attributes. The key type is verified by the KeyType parameter and treated accordingly.

The key is then taken into the key management held in the cache operation and, if applicable, the duplicate predecessor is deleted.

The DT is decrypted by the KT that is identified by the KeyKTID parameter; for all of the other key types, this parameter is not taken into consideration and is filled with zeros.

The dependence of the CKA_END_DATE attribute is important. It indicates the end date of the key predecessor.

The key attribute of the imported key contains the random number by means of which the hash value is to be formed using SHA-1. The hash value is returned in the HashValue parameter of the embedded method. The hash value is needed for the key acknowledgement message.

In case of error during the unwrap mechanism or the hash formation, the appropriate error code is output in the return value, otherwise CKR_OK.

```
CK_RV CE_GetKeyCount (CK_SESSION_HANDLE session,
    CE_EnumKey KeyType,
    int* counter)
```

The function allocation CE_GetKeyCount shows how many keys of each key type are registered on the card in the key management held in the cache operation. In this manner, the key attributes can be read out in conjunction with the method described below.

This method is defined as follows:

```
CK_RV CE_GetAttribute (CK_SESSION_HANDLE session,
    CE_EnumKey KeyType,
    CE_EnumKeyAttribute KeyAttribute,
    int pos,
    CK_BYTE [ ] * attribute,
    int* length)
```

The key type is determined via the KeyType parameter and thus also the table that is to be read from when the different key types on the crypto-hardware are recorded in different lists according to the type of key.

The KeyAttribute parameter specifies the attribute that is to be read out and the ITEM parameter indicates the starting point within a table; its maximum value first has to be acquired using the CE_GetKeyCount method for all keys or else for one key type. When the CKA_END_DATE attribute is output, it must be noted that the last current key is theoretically infinitely valid (until a new key of the same type is imported) and, in its CKA_END_DATE attribute, contains the end date for the predecessor key of the same key type, whereby the CKA_END_DATE of this indicated key is output.

The attributes for a date have a fixed length of 8 bytes whereas the CSK_ID and CKA_LABEL attributes have a fixed length of 128 bytes. If the attributes within the keys for these two parameters should be shorter than 128 bytes, then the remaining bytes up to 128 are filled up with zeros. Thus, the user can always provide sufficient memory for the methods in question. In case the user provides a buffer that is too small, the information is trimmed and a message to this effect is transmitted via CK_RV.

```
CK_RV CE_DeleteExpiredKeys (CK_SESSION_HANDLE session,
    CE_EnumKey KeyType,
    int* counter)
```

The function allocation CE_DeleteExpiredKeys searches the card for expired keys and deletes them from the card. Expired keys can be identified by the fact that the system date is older than the CKA_END_DATE of the successor key, see under 2.5.8; this also applies to KT and KS. Selective deletion is made possible through the EnumType and the entire card can be deleted by means of CE_KA (only the LMK is retained). It is important that this method must not be allowed to become active when a key import is carried out. This is preferably controlled in the embedded code and indicated with an appropriate return value. Thanks to this measure, any indeterminate side effects in the internal key management are avoided.

The interface between the payment assurance system and the value transfer center is preferably as narrow as possible in order to rule out manipulation possibilities through side channels.

Figure 3:
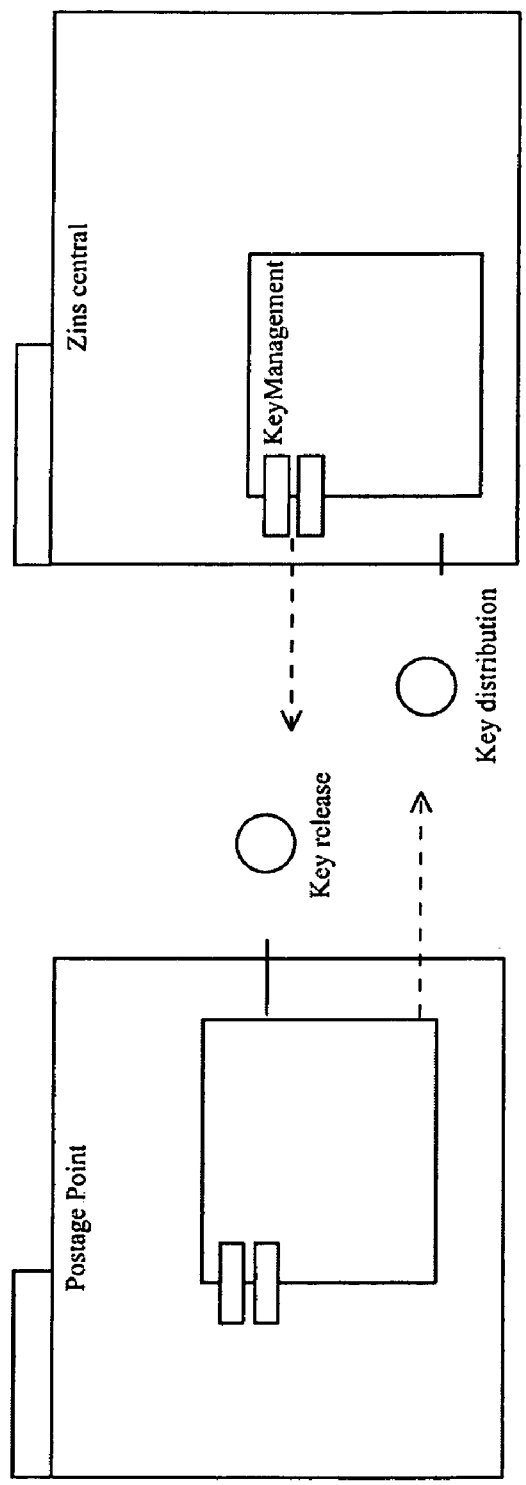
FIG. 3 is a schematic diagram of an interface between a central payment assurance system (ZinS central system) and a value transfer center (Postage Point)

The structure of the interface between the value transfer center (Postage Point) and the central payment assurance system is shown in FIG. 3.

The central payment assurance system provides an interface for distributing keys by means of which keys generated in the KeyManagement component of the value transfer center (Postage Point) can be distributed to the crypto-systems of the payment assurance systems.

The value transfer center provides the payment assurance system with a key release interface by means of which the payment assurance system can release the key after the successful distribution and processing of said key.

Since mainly Java is used in both projects, an application interface realization using Session Beans is recommended. In order to uncouple the two systems, the services should be looked up by a naming service using JNDI.

A Session Bean provides the necessary functionality for importing the key data into the ZinS central system.

Figure 4:
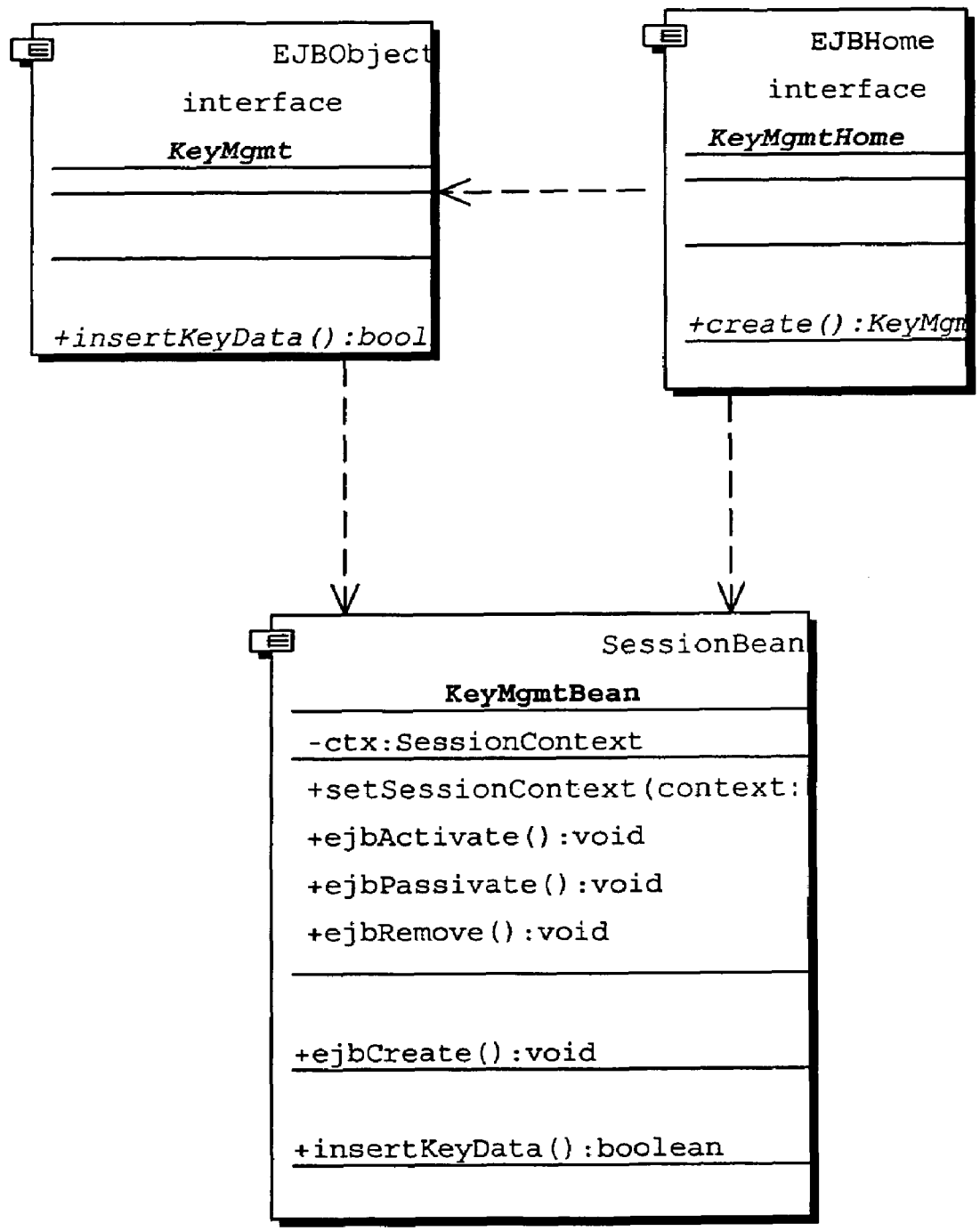
FIG. 4 illustrates process steps for integrating a data key into the central payment assurance system (ZinS central)
Figure 5:
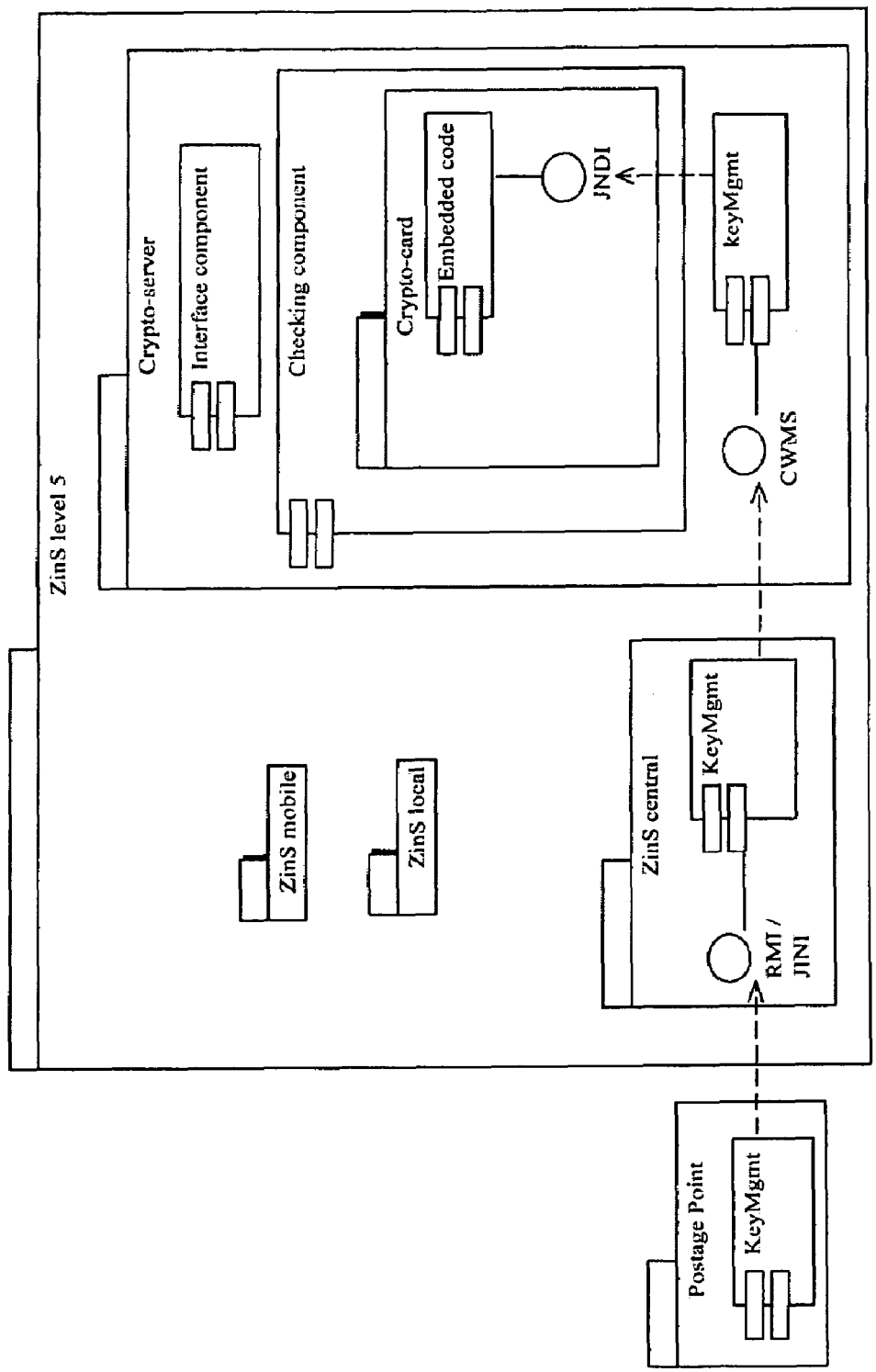
FIG. 5 is a schematic diagram of a key distribution from the central payment assurance system (ZinS central system) to local payment assurance systems including the appertaining crypto-systems.

FIG. 4 shows process steps for integration of a data key into the central payment assurance system (ZinS central).

The process routine ImportKey transfers the data key set to the ZinS central.

Depending on the use of ASN.1 messages, this process routine prepares the received message and causes the message to be stored in the database. The process routine ImportKey then initiates the distribution of the key data to the ZinS local systems by means of CWMS.

The sequence of importing the data into the database and subsequent distribution of the messages should be observed. This ensures that the received data is secured before work is done to it or with it. The advantage of this approach is that events in the realm of errors can be better reconstructed and, in case of a data loss, access can be gained to the database if need be.

The parameters of the InsertKeyData method are not yet specified since at this point in time, it is not yet clear whether the ASN.1 format is supported. However, the method will have to be equipped with two parameters in order to also be able to sent a detailed message to the Postage Point.

In ZinS central, the distribution method of the key allocation system is responsible for the following:

1. archiving the key message on the ZinS central server.

2. distributing the key messages from the Postage Point to the individual mail centers by means of the CWMS interface provided by Vibris. The structure and use of the CWMS service can be found in the manual of this interface.

3. after the distribution and import into the individual mail centers has been completed, an appertaining return message is generated.

The data is transmitted from the value transfer center (Postage Point) in the ASN.1 format. The appertaining return response is likewise expected in the ASN.1 format. Instead of this format, however, other formats can, of course, also be used. The particular formats are adapted for use by a suitable parser.

Preferred data formats in ASN.1 are the following:

Distribution Message for the Transport Key

```
TransportKeyMessage ::= SEQUENCE
{
MsgType OCTET STRING, ( fix 'KT' )
Version OCTET STRING, ( 0x01 )
KeyID OCTET STRING, ( CKA_ID )
SigKeyID OCTET STRING, ( CKA_ID of SignatureKey used
for MAC )
TransKeyEncrypt OCTET STRING, ( TransportKey wrapped
with LMK )
MAC OCTET STRING ( MAC over all previous elements )
}
```

Distribution Message for the Data Key

```
PostageKeyMessage ::= SEQUENCE
{
MsgType OCTET STRING, ( fix 'KD' )
Version OCTET STRING, ( 0x01 )
KeyID OCTET STRING, ( CKA_ID )
KeyGeneration OCTET STRING, ( 0x01 ascending )
SigKeyID OCTET STRING, ( CKA_ID of SignatureKey used
for MAC)
TransKeyID OCTET STRING, ( CKA_ID of TransportKey )
DataKeyEncrypted OCTET STRING, ( PostageKey wrapped
with LMK
and
encrypted with TransportKey )
MAC OCTET STRING ( MAC over all previous elements )
}
```

Also see section 2.4.6.

Release Message

```
KeyExchangeReceipt ::= SEQUENCE
{
KeyID OCTET STRING, ( CKA_ID of received key )
KeyLabelHash OCTET STRING, ( SHA-1 hash of CKA_LABEL of
received key )
State BOOLEAN, ( TRUE/FALSE to enable/dismiss key )
Message OCTET STRING ( Description of success/failure )
}
```

The data structures can have a different set-up. However, a set-up according to the embodiments presented is advantageous since they allow the transmission of all of the information that is to be taken into consideration and they account for a small data transmission effort. In particular, the data is transmitted via CWMS to the local payment assurance systems which are preferably located in mail centers of the postal service provider.

When the ASN.1 format is used, the data would first have to be parsed into the internal key message, which would be dispensed with if the messages defined in this document were used directly.

The data packets received through the CWMS correspond to the key messages previously defined in this document. These messages are then subjected to the VerifyMsg method of the embedded code after they have first been adapted to the data table above title "Attributes of the data key KD". After the verification, either the import of the key is started via the embedded code or else an appropriate error message is generated. Compare key messages and pages 12 to 14 in terms of the import data structure of the CE_ImportKey embedded code method. The deletion of the old keys as well as the updating are carried out automatically by the above-described embedded code methods.

Every day, the CE_DeleteExpiredKeys method is invoked which removes the expired keys from the crypto-hardware daily, whenever this is necessary. During the import, the CA_ImportKey method ensures that duplicate keys are deleted and that newer ones replace them.

The embedded code methods are bound to the application by the Java class CryptoAdapters. CryptoAdapters offer all functions (similarly named) that the embedded code and other PKCS#11 methods offer.

By means of JNI, a DLL (CryptoAdapter.DLL) is used that has statically linked the DLL provided by Zaxus. The security risk is further minimized through the static linking.

The C++ implementation of the JNI interface also provides error handling for each requested session; in this context, see Stage 3 under "multithreading" in the PCEM Design Document. The worker concept is supported in that the crypto-hardware is initialized in the multithreading mode and, after the login, each worker gets its own session (getsession, C_GetSession), as a result of which this worker is registered in the DLL and error handling is established specifically for the worker. The mainstream of the DLL is addressed by the login and likewise has its own error handling for the execution of Pkcs#11 methods and the embedded methods.

Figure 6:
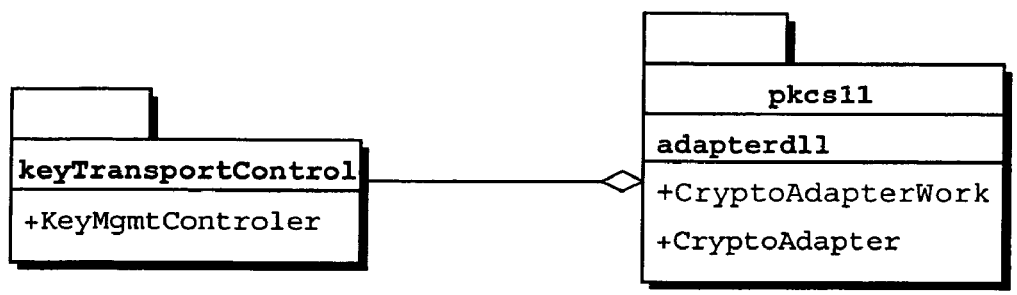
FIG. 6 illustrates a connection of the DLL interface.

FIG. 6 shows an overview of the implementation. Preferably, the key list and the code that is provided by the embedded methods are removed. Otherwise, the set-up of the structures must be selected to be identical.

Connection of the DLL

Figure 7A:
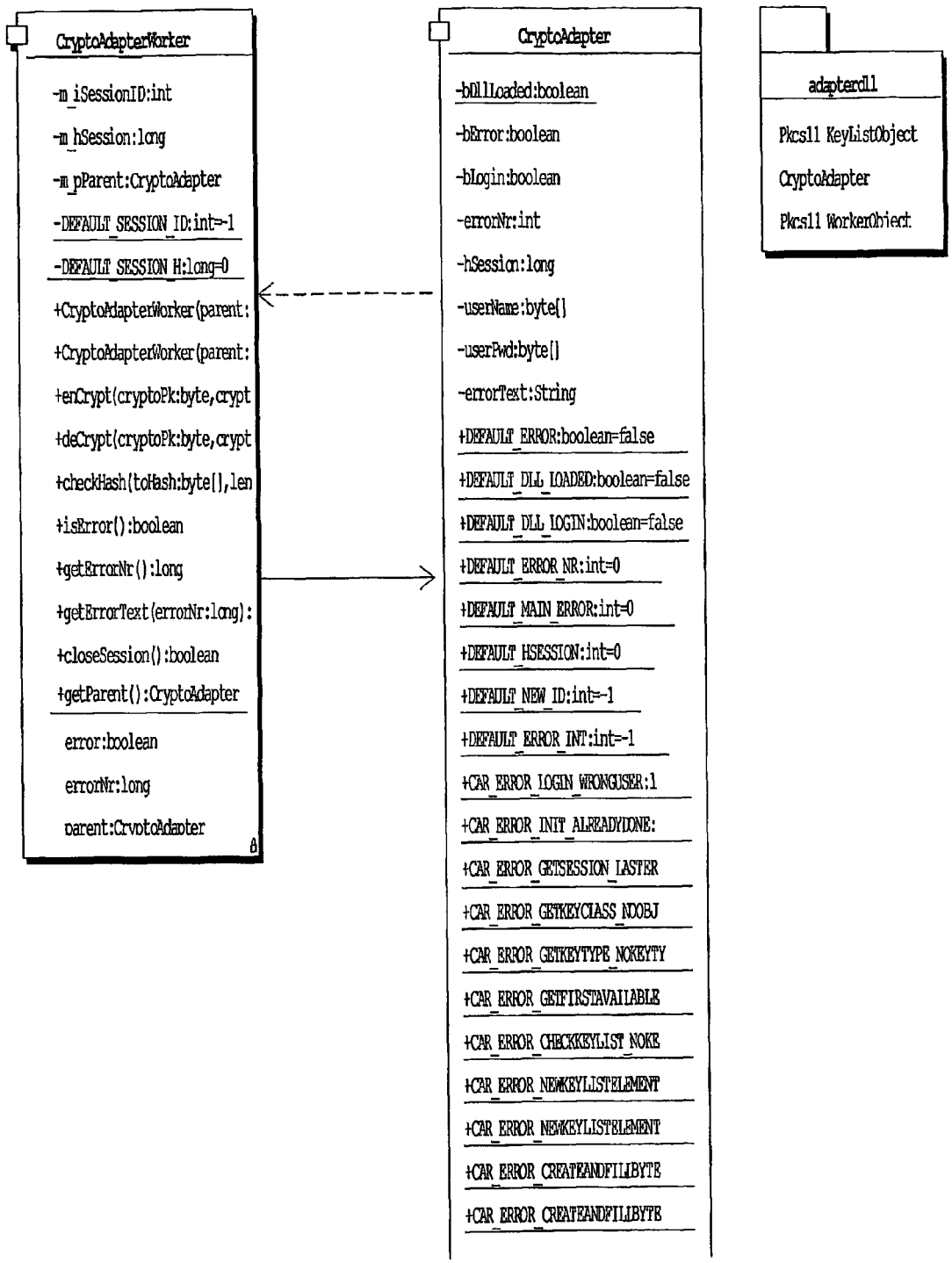
FIG. 7 is a schematic diagram of process steps for encapsulating components and for handling error messages.

A preferred encapsulation and an advantageous error handling are shown in FIG. 7 by way of an example.

An implementation of the key lists is not needed if the key lists are held completely in the embedded code of the crypto-hardware. The GetAttribute methods decrease to the one single invocation of the embedded CE_GetAttribute method; by the same token, the invocations for the import and its implementation are reduced since this is automatically carried out by the embedded code after the transfer of the necessary data.

An expanded error constant list is provided in the embedded code.

The key messages from the Postage Point are stored in ZinS central in a database in order to allow a later replacement of a defective local payment assurance system. First of all, it is required that the message as such be incorporated into the database and secondly, that administrative information be received.

Consequently, the following database tables are needed.

| TransportKeyData | |
| --- | --- |
| SDItemNo | INT |
| Key data record | See table on page 29 |

Key data stores the key message in the way in which it was received by the Postage Point; in case of a failure of a local payment assurance system, the archiving of the key message serves to coordinate the failed local payment assurance system with the other remaining local payment assurance systems by importing the archived key. Before the storage, the message has to be parsed by ASN.1 in order to transmit it to the local systems. The shared form of the data records is preferred as the storage modality; this corresponds to the table that describes the data block that is used for the CE_VerifyMessage embedded method.

| TransportKeyManagement | |
| --- | --- |
| SNItemNo | Number |
| ReceiptDate | DATE ( / timestamp ) |
| CompletionDate | DATE ( / timestamp ) |
| DistributionDate | DATE ( / timestamp ) |
| EndStatus | VARCHAR(20) |
| StatusText | VARCHAR(20) |

This data record has a central significance. First of all, it serves to evaluate the feedback received from the local payment assurance system in the mail centers, preferably all of the mail centers that are integrated into the mailing system of the postal service provider, as well as to conduct a capable error analysis and to alarm of the system operator whenever the time is exceeded during the distribution procedure.

By the same token, this table involves administrative information processing. This makes it possible to use the entry SNItemNo to allocate and to evaluate the appertaining TransportKeyData table and the TransportKeyReplayMessage of the individual (83) mail centers, if applicable.

| TransportKeyReplayMessage | |
| --- | --- |
| SNItemNo | Number |
| MailCenterNo | Number |
| MessageDate | DATE ( / timestamp ) |
| MessageText | VARCHAR(520) |

In this table, the individual key response messages of the local payment assurance system are archived in the mail centers of the postal service provider as a function of the import procedure.

The invention claimed is:

1. A method for verifying postage indicia generated in customer systems using a data key and applied onto mailpieces, each postage indicium containing decrypted cryptographic information used for verifying the postage indicium, said method comprising:

generating the data key in a value transfer center and transmitting the data key to a central payment assurance system, transmitting the data key from the central payment assurance system to local payment assurance systems and importing the data key in the local payment assurance systems, transmitting a result of the importing step from the local payment assurance systems to the central payment assurance system and to the value transfer center, after the data key has been successfully imported into essentially all local payment assurance systems, the value transfer center issuing the data key to the customer systems for producing the postage indicia, and verifying the postage indicia by decrypting the cryptographic information using the data key in the local payment assurance systems.

2. The method according to claim 1, comprising providing or transmitting the data key with an end date for a preceding data key.

3. The method according to claim 2, comprising transmitting a data key to a cryptographic element and the cryptographic element checking whether other data keys have an end date and whether the end date stored for a successor data key is older than a date stored in the payment assurance system.

4. The method according to claim 1, comprising providing or transmitting the data key with a generation counter.

5. The method according to claim 4, comprising transmitting the data key to a cryptographic element and, as soon as the cryptographic element receives the data key, the cryptographic element deleting all data keys that have the same generation counter value as the transmitted data key.

6. The method according to claim 1, wherein the data key is a symmetrical key.

7. The method according to claim 1, comprising the value transfer center encrypting the data key with a transport key.

8. The method according to claim 7, comprising encrypting the transport key with a master transport key.

9. The method according to claim 1, comprising providing the data key with key identification information.

10. The method according to claim 9, comprising transmitting the key identification information in encrypted form.

11. The method according to claim 1, wherein the data key forms a component of a franking key for the generation of postage indicia.

12. The method according to claim 2, comprising using the preceding data key for verifying postage indicia until the end date.

* * * * *